United States Patent
Chen et al.

(10) Patent No.: US 9,482,586 B2
(45) Date of Patent: Nov. 1, 2016

(54) HEATING CONTROL APPARATUS AND CONTROL METHOD THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Ju-Chou Chen, New Taipei (TW); Chih-Ming Chang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/514,387

(22) Filed: Oct. 15, 2014

(65) Prior Publication Data

US 2016/0052209 A1 Feb. 25, 2016

(30) Foreign Application Priority Data

Aug. 21, 2014 (TW) .............................. 103128779 A (51) Int. Cl.
*G01K 13/00* (2006.01)
*B33Y 50/02* (2015.01)

(52) U.S. Cl.
CPC .............. *G01K 13/00* (2013.01); *B33Y 50/02* (2014.12)

(58) Field of Classification Search
CPC .. B29C 67/0088; G01K 13/00; B33Y 10/00; B33Y 40/00
See application file for complete search history.

(56) References Cited

U.S. PATENT DOCUMENTS

2006/0191957 A1* 8/2006 Axinte .............. B05C 17/00526
222/146.5
2008/0023864 A1* 1/2008 Okada ..................... B29C 45/74
264/40.1

FOREIGN PATENT DOCUMENTS

TW  I268849  12/2006

OTHER PUBLICATIONS

Office Action of Taiwan Counterpart Application, issued on Jun. 20, 2016, p. 1-p. 8.

* cited by examiner

*Primary Examiner* — Stephen Meier
*Assistant Examiner* — Alexander D Shenderov
(74) *Attorney, Agent, or Firm* — Jianq Chyun IP Office (57) ABSTRACT

A heating control apparatus and a control method thereof are provided. The heating control apparatus includes a heating module, a temperature sensing module, a pulse width modulation circuit, and a comparator. Input terminals of the comparator are respectively coupled to the temperature sensing module and the pulse width modulation circuit, and an output terminal of the comparator is coupled to the heating module. In the control method, a heating temperature of the heating module is sensed by the temperature sensing module, so as to provide a temperature sensing signal. The comparator receives the temperature sensing signal and a pulse width modulation signal generated by the pulse width modulation circuit and compares the temperature sensing signal and the pulse width modulation signal to generate a comparing pulse width modulation signal, so as to control the heating temperature of the heating module by using the comparing pulse width modulation signal.

6 Claims, 5 Drawing Sheets

HEATING CONTROL APPARATUS AND CONTROL METHOD THEREOF

CROSS-REFERENCE TO RELATED APPLICATION

This application claims the priority benefit of Taiwan application serial no. 103128779, filed on Aug. 21, 2014. The entirety of the above-mentioned patent application is hereby incorporated by reference herein and made a part of this specification.

BACKGROUND OF THE INVENTION

1. Field of the Invention

The invention relates a heating control apparatus, and more particularly, relates to a heating control apparatus that uses a hardware circuit to directly control a heating temperature of a heating module and a control method thereof.

2. Description of Related Art

With continuous advancements in printing technologies, three-dimensional printing has now become a very popular industry. Three-dimensional printing is also known as additive manufacturing which belongs to one of rapid prototyping technologies. In three-dimensional printing, a digital forming graphic file of a three-dimensional (3D) model built based on a computer aided design (CAD) software is converted into a plurality of thin (quasi-two-dimensional) cross-sectional layers (e.g., X-Y plane layers) stacked over one another in succession, and a 3D real object may be built by using a building material (e.g., metals or plastics in powdered form) in ways of layer-by-layer printing (e.g., along Z-axis direction) to cure the building material layer by layer.

Said building material has a specific melting point based on its material characteristic, and thus it is required to precisely control a temperature of a nozzle during three-dimensional printing, or else the building material may be charred or unable to exhibit in a complete molten state. In the existing technologies, a processor of a three-dimensional printing apparatus is usually used to sense the current temperature of the nozzle by a temperature sensor on the nozzle, and then a control signal is generated according to the current temperature of the nozzle and a preset temperature of the nozzle which is currently required, so as to dynamically control a heating apparatus of the nozzle as whether to perform heating or not. However, it requires longer operating time for the processor to determine the temperature of the nozzle before generating the control signal, such that a temperature variation of the nozzle may still not as expected. Accordingly, manufacturers are still searching for a heating control technique that is capable of instantly controlling the heating apparatus in order to provide a stable temperature for the nozzle.

SUMMARY OF THE INVENTION

The invention is directed to a heating control apparatus and a control method thereof, and capable of instantly controlling a heating condition of a heating module by directly using a hardware circuit (e.g., by using a comparator) and also capable of effectively reducing a temperature variation between the current temperature and the preset temperature of an object (e.g., a nozzle).

The heating control apparatus of the invention includes a heating module, a temperature sensing module, a pulse width modulation (PWM) circuit, and a comparator. The heating module is configured to heat a nozzle, and the temperature sensing module is configured to sense a heating temperature of a heating module to correspondingly generate and provide a temperature sensing signal according to the heating temperature. The pulse width modulation circuit is configured to generate a pulse width modulation signal. Further, input terminals of the comparator are respectively coupled to the temperature sensing module and the pulse width modulation circuit, and an output terminal of the comparator is coupled to the heating module. The comparator is configured to receive the temperature sensing signal and the pulse width modulation signal and compare the temperature sensing signal and the pulse width modulation signal to generate a comparing pulse width modulation signal in order to control the heating temperature of the heating module by using the comparing pulse width modulation signal.

In an embodiment of the invention, the pulse width modulation circuit is co-constructed with a processor, and the processor is coupled to the input terminals of the comparator in order to adjust the pulse width modulation signal through the pulse width modulation circuit.

In an embodiment of the invention, the heating control apparatus further includes an inverter. The inverter is coupled to the processor and the comparator, and is configured to receive the pulse width modulation signal. The inverter provides a first level signal to the comparator when the pulse width modulation signal is not yet received by the inverter from the pulse width modulation circuit. The inverter provides the pulse width modulation signal to the comparator when the pulse width modulation signal is received by the inverter from the pulse width modulation circuit.

In an embodiment of the invention, the heating control apparatus further includes a buffer circuit. The buffer circuit is coupled to the pulse width modulation circuit and the comparator, and is configured to provide the adjusted pulse width modulation signal to the comparator.

In an embodiment of the invention, the buffer circuit includes a resistance-capacitance circuit.

In an embodiment of the invention, the heating control apparatus further includes a switch. The switch is coupled to the comparator, and is configured to receive the comparing pulse width modulation signal. When the comparing pulse width modulation signal of a second level provided by the comparator is received by the switch, the switch is turned on in response to the comparing pulse width modulation signal of the second level in order to increase the heating temperature of the heating module accordingly. When the compared pulse width modulation signal of a third level is received by the switch, the switch is turned off in response to the comparing pulse width modulation signal of the third level in order to stop increasing the heating temperature of the heating module accordingly.

The invention further provides a control method of a heating control apparatus, and the control method includes the following steps. A heating temperature is sensed to correspondingly generate and provide a temperature sensing signal according to the heating temperature. The temperature sensing signal and a pulse width modulation signal are received. Further, the temperature sensing signal and the pulse width modulation signal are compared to generate a comparing pulse width modulation signal in order to control the heating temperature by using the comparing pulse width modulation signal.

In an embodiment of the invention, the step of receiving the temperature sensing signal and the pulse width modulation signal includes the following steps. The pulse width modulation signal adjusted by a processor is received from the processor.

In an embodiment of the invention, the step of receiving the temperature sensing signal and the pulse width modulation signal includes the following steps. A first level signal is provided when the pulse width modulation signal is not yet received from the processor. Further, the pulse width modulation signal is provided when the pulse width modulation signal is received from the processor.

In an embodiment of the invention, the step of receiving the temperature sensing signal and the pulse width modulation signal includes the following steps. The pulse width modulation signal is received, so as to provide the adjusted pulse width modulation signal.

In an embodiment of the invention, the step of comparing the temperature sensing signal and the pulse width modulation signal to generate the comparing pulse width modulation signal in order to control the heating temperature by using the comparing pulse width modulation signal includes the following steps. The comparing pulse width modulation signal is received. When the compared pulse width modulation signal of a second level is received, a switch of the heating control apparatus is turned on in response to the comparing pulse width modulation signal of the second level in order to increase the heating temperature accordingly. In addition, when the compared pulse width modulation signal of a third level is received, the switch of the heating control apparatus is turned off in response to the comparing pulse width modulation signal of the third level in order to stop increasing the heating temperature accordingly.

Based on above, in the heating control apparatus and the control method thereof according to the embodiments of the invention, the comparator is used to receive the temperature sensing signal sensed by the temperature sensing module. This temperature sensing signal is generated by the temperature sensing module in response to the heating temperature of the heating module. The comparator compares the pulse width modulation signal of the processor provided by the pulse width modulation circuit and the temperature sensing signal, so as to control the heating temperature of the heating module according to a compared result. Accordingly, the heating control apparatus according to the embodiments of the invention utilizes the hardware logic circuit (e.g., the comparator) as a replacement of the original processor (e.g., a central processing unit) to perform heating control of the heating apparatus. As a result, the reaction speed for controlling the heating temperature can be effectively enhanced, and the temperature variation between the heating temperature and the preset temperature of the object (e.g., the nozzle) can be effectively reduced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Generally, a hardware circuit is capable of rapidly reacting to input signals, and providing corresponding output signals at output terminals or specific pins. In this regard, in order to provide an instant temperature control and maintain a stable temperature, the invention adopts a hardware logic circuit (e.g., a comparator), which receives a temperature sensing signal sensed by a temperature sensing module in response to a heating temperature of a heating module, and compares the temperature sensing signal with a pulse width modulation signal transmitted from a pulse width modulation circuit of a processor, so as to provide a comparing pulse width modulation signal according to a compared result to control the heating temperature of the heating module. Accordingly, a reaction speed for controlling the heating temperature can be effectively enhanced, and a temperature variation between the heating temperature and a preset temperature can be effectively improved.

Figure 1:
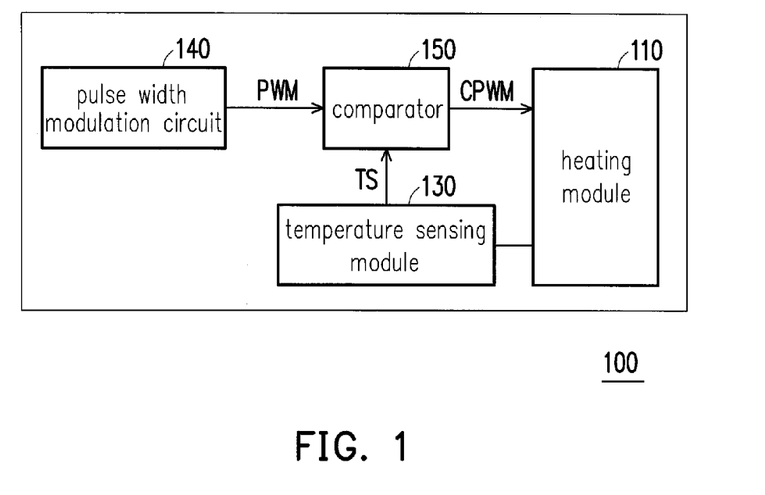
FIG. 1 is a block diagram illustrating a heating control apparatus according to an embodiment of the invention.

FIG. 1 is a block diagram illustrating a heating control apparatus according to an embodiment of the invention. Referring to FIG. 1, a heating control apparatus 100 includes a heating module 110, a temperature sensing module 130, a pulse width modulation circuit 140, and a comparator 150. The heating control apparatus 100 of the invention can be applied in the three-dimensional printing apparatus configured to heat at least one nozzle of the three-dimensional printing apparatus, or can be applied in other electronic apparatuses which are required to instantly control the temperature and provide the stable temperature (e.g., an electric rice cooker, an oven, etc.).

The heating module 110 is configured to heat the nozzle (e.g., the at least one nozzle or a heating head of the three-dimensional printing apparatus). In other embodiments, the heating module 100 can also heat an object such as an inner pot of the electric rice cooker and a chest body of the oven. In an embodiment, the heating module 110 can receive a comparing pulse width modulation signal CPWM, and the heating module 110 can heat the nozzle according to the comparing pulse width modulation signal CPWM of a second level (e.g., high level or low level) and stop heating the nozzle according to the comparing pulse width modulation signal CPWM of a third level (low level or high level) different from the second level.

The temperature sensing module 130 includes, for example, a temperature sensing pin (e.g., a negative temperature coefficient (NTC) thermal sensitive resister). The temperature sensing pin can be connected to the nozzle or the heating head heated by the heating module 110 to sense a heating temperature and correspondingly generate a temperature sensing signal TS (e.g., a negative temperature coefficient signal) in response to the heating temperature. For example, the temperature sensing module 130 can reduce a resistance value of the negative temperature coefficient signal in response to increases in the heating temperature, or the temperature sensing module 130 can increase the resistance value of the negative temperature coefficient signal in response to reductions in the heating temperature. It should be noted, persons applying the invention may utilize temperature sensors in different technologies (e.g., thermistor, thermocouple, resistance temperature detectors (RTD) or an infra red (IR) sensor) to sense the heating temperature, which are not particularly limited in the embodiments of the invention.

The pulse width modulation circuit 140 is, for example, a pulse width modulation circuit of sinusoidal PWM (SPWM) type or space vector PWM (SV-PWM) type. In the present embodiment, the pulse width modulation circuit 140 is co-constructed with a processor (e.g., a central processing unit (CPU), a micro control unit (MCU), etc.). For instance, the pulse width modulation circuit 140 is embedded in the processor. The processor is coupled to input terminals of the comparator 150 in order to adjust the pulse width modulation signal PWM through the pulse width modulation circuit 140. For example, the processor can adjust a duty circle, a frequency and/or an operational voltage of the pulse width modulation signal PWM.

The input terminals of the comparator 150 are respectively coupled to the temperature sensing module 130 and the pulse width modulation circuit 140, and an output terminal of the comparator 150 is coupled to the heating module 110. The comparator 150 is, for example, an operational amplifier (OPA) comparison circuit, a voltage comparison chip or a logic circuit, and the comparator 150 receives and compares the pulse width modulation signal PWM and the temperature sensing signal TS in order to output the comparing pulse width modulation signal CPWM to the heating module 110. In the embodiments of the invention, the comparator 150 receives the pulse width modulation signal PWM from the pulse width modulation circuit 140 co-constructed with the processor. It should be noted that, in the existing three-dimensional printing apparatuses, it is often that the processor of the three-dimensional printing apparatus is used to receive the temperature sensing signal TS provided by the temperature sensing module 130 and provide a control signal according to the temperature sensing signal TS in order to control the heating temperature of the heating module 110. However, it requires a period of operating time for aforesaid processor to determine the signals due to security issues such as electrostatic discharge, such that the temperature variation for controlling the temperature may be too large (e.g., ±5° C.). In this regard, the comparator 150 is directly utilized to control the heating temperature of the heating module 110 in the embodiments of the invention, so as to enhance speed for controlling the temperature. This will be discussed with reference to an embodiment provided as follows.

Figure 2:
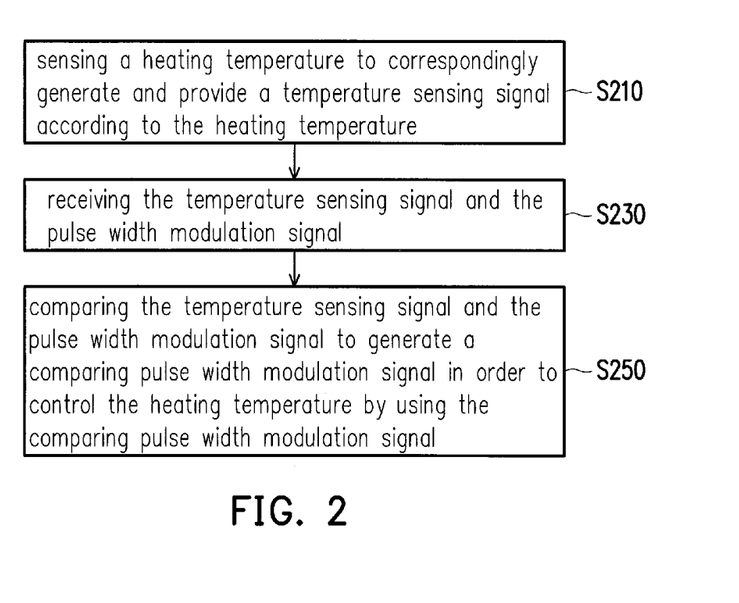
FIG. 2 is a flowchart illustrating a control method of the heating control apparatus of FIG. 1 according to an embodiment of the invention.

FIG. 2 is a flowchart illustrating a control method of the heating control apparatus 100 of FIG. 1 according to an embodiment of the invention. Referring to FIG. 2, a control method of the present embodiment is adapted to the heating control apparatus 100 of FIG. 1. Hereinafter, the control method according to the embodiments of the invention is described below by reference with various elements in the heating control apparatus 100. Each step in the playing method may be adjusted based on actual conditions, and the invention is not limited thereto.

Figure 3:
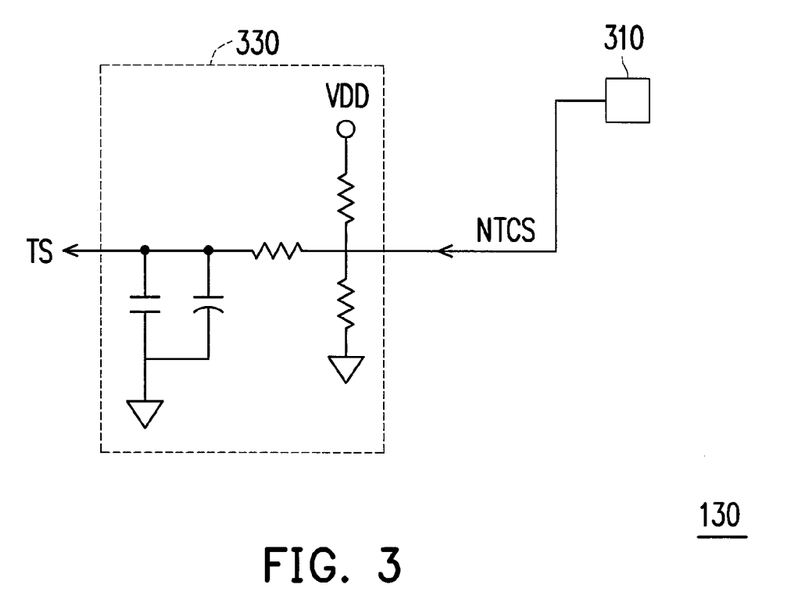
FIG. 3 is an example illustrating the temperature sensing module of FIG. 1 according to an embodiment of the invention.

In step S210, the temperature sensing module 130 senses the heating temperature of the heating module 110 to correspondingly generate and provide the temperature sensing signal TS according to the heating temperature. For instance, FIG. 3 is an example illustrating the temperature sensing module 130 of FIG. 1 according to an embodiment of the invention. Referring to FIG. 3, the temperature sensing module 130 includes a negative temperature coefficient resistor 310 and a signal adjusting circuit 330. The negative temperature coefficient resistor 310 is coupled to the heating module 110, and is configured to sense the heating temperature of the heating module 110 and provide a negative temperature coefficient signal NTCS to the signal adjusting circuit 330. The signal adjusting circuit 330 provides the temperature sensing signal TS by, for example, performing methods including voltage division or electric storage on the negative temperature coefficient signal NTCS.

Figure 4:
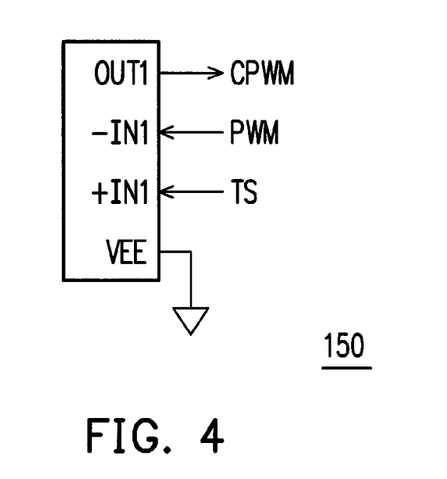
FIG. 4 is an example illustrating the comparator of FIG. 1 according to an embodiment of the invention.

In step S230, the comparator 150 receives the temperature sensing signal TS and the pulse width modulation signal PWM (e.g., provided by the pulse width modulation circuit 140 of the micro control unit or the central processing unit). For instance, FIG. 4 is an example illustrating the comparator 150 of FIG. 1 according to an embodiment of the invention. Referring to FIG. 4, the comparator 150 includes an output pin OUT, a negative input pin −IN1, a positive input pin +IN1 and a ground pin VEE. Among them, the negative input pin −IN1 receives the pulse width modulation signal PWM, and the positive input pin +IN1 receives the temperature sensing signal TS. In other embodiments, the comparator 150 may also be the operational amplifier comparison circuit in which a non-inverting input terminal receives the temperature sensing signal TS, and an inverting input terminal receives the pulse width modulation signal PWM. In other embodiments, the heating control apparatus 100 can also receive the pulse width modulation signal PWM through the positive input pin +IN1 of FIG. 4 or the non-inverting input terminal of the operational amplifier comparison circuit, and receive the temperature sensing signal TS through the negative input pin −IN1 of FIG. 4 or the inverting input terminal of the operational amplifier comparison circuit, which are changeable depending on design requirements.

In step S250, the comparator 150 compares the temperature sensing signal TS and the pulse width modulation signal PWM to generate the comparing pulse width modulation signal CPWM in order to control the heating temperature of the heating module 110 by using the comparing pulse width modulation signal CPWM. For instance, take the comparator 150 of FIG. 4 for example, it is assumed that an average voltage of the pulse width modulation signal PWM is 1V (volt) and the heating temperature of the heating module 110 is at room temperature (e.g., 25° C.). Accordingly, the temperature sensing module 130 provides the temperature sensing signal TS having higher voltage value (e.g., 2V). In this case, the output pin of the comparator 150 of FIG. 4 outputs the comparing pulse width modulation signal CPWM with high level (e.g., the voltage value is 2V, 3V, etc.) to the heating module 110. In another example, it is assumed that the average voltage of the pulse width modulation signal PWM is 1.5V and the heating temperature of the heating module 110 is at 220° C. Accordingly, the temperature sensing module 130 provides the temperature sensing signal TS with lower voltage value (e.g., 0.3V). In this case, the output pin of the comparator 150 of FIG. 4 outputs the comparing pulse width modulation signal CPWM with low level (e.g., the voltage value is −0.5, −1V, etc.) to the heating module 110.

Figure 5:
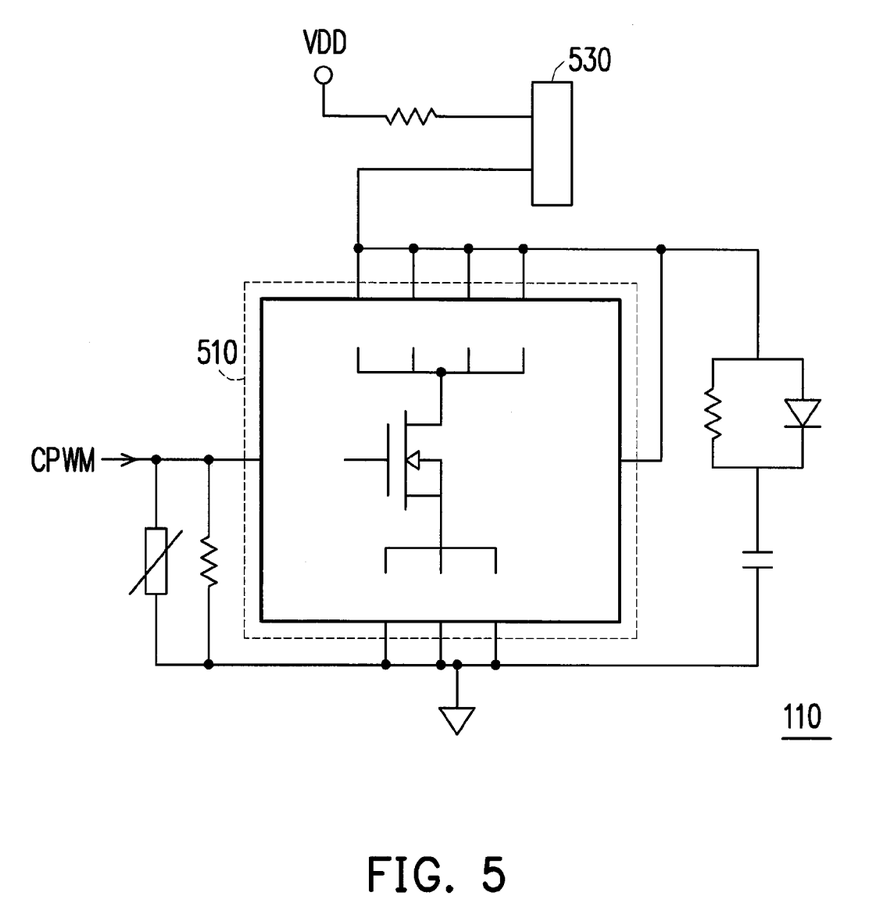
FIG. 5 is an example illustrating the heating module of FIG. 1 according to an embodiment of the invention.

In addition, FIG. 5 is an example illustrating the heating module 110 of FIG. 1 according to an embodiment of the invention. Referring to FIG. 5, the heating module 110 includes a switch 510 and a heating head 530. The switch 510 is, for example, a N-type metal-oxide-semiconductor field emission transistor (N-MOSFET), and the heating head 530 is coupled to the nozzle (or the object such as the inner pot of the electric rice cooker and the chest body of the oven) in order to heat the nozzle.

The switch 510 is coupled to the comparator 150, and is configured to receive the comparing pulse width modulation signal CPWM. When the switch 510 receives the comparing pulse width modulation signal CPWM of the second level (e.g., the average voltage is −0.5V, 2V, 3V, etc.) provided by the comparator 150, the switch 510 is turned on in response to the comparing pulse width modulation signal CPWM of the second level, so as to increase the heating temperature of the heating module 110 accordingly. When the switch 510 receives the comparing pulse width modulation signal CPWM of the third level (e.g., the average voltage is −0.5V, −1V, 1V, etc.) provided by the comparator 150, the switch 510 is turned off in response to the comparing pulse width modulation signal CPWM of the third level, so as to stop increasing the heating temperature of the heating module 110 accordingly.

It should be noted that, the comparing pulse width modulation signal CPWM is generated based the comparison between the voltage value of the temperature sensing signal TS and the average voltage value of the pulse width modulation signal PWM. Among them, when the pulse width modulation signal PWM having a specific duty cycle (e.g., 30%, 50%, etc.) is provided by the processor through the pulse width modulation circuit 140, the comparator 150 may receive the pulse width modulation signal PWM (e.g., through a voltage division circuit) having a specific average voltage value (e.g., 1V, 2V, etc.). Further, the voltage value of the temperature sensing signal TS is in response to the heating temperature. In other words, when the heating temperature reaches the preset temperature (e.g., 150° C., 250° C., etc.), the voltage value of the temperature sensing signal TS will be less than the average voltage value of the pulse width modulation signal PWM, such that the heating module 110 will stop heating the object. Therefore, the pulse width modulation signal PWM provided by the processor may be adjusted by persons applying the embodiments of the invention based on design requirements (e.g., adjusting the duty cycle of the pulse width modulation signal PWM) in order maintain the heating temperature at the preset temperature (e.g., 200° C., 300° C., etc.), which is not particularly limited in the invention.

Accordingly, the heating control apparatus 100 according to the embodiments of the invention is capable of enhancing the reaction speed for controlling the heating temperature. Also, the temperature variation between heating temperature and the preset temperature may be improved to ±2.5° C. As a result, the three-dimensional printing apparatus applying the heating control apparatus 100 of the invention is capable of stably heating the nozzle and thereby improving a printing quality thereof.

Moreover, in order to further improve the temperature variation between the heating temperature and the preset temperature, the heating control apparatus 100 can further include a buffer circuit. The buffer circuit is coupled to the pulse width modulation circuit 140 and the comparator 150, and is configured to receive the pulse width modulation signal PWM and provide the adjusted pulse width modulation signal PWM to the comparator 150. In an embodiment, the buffer circuit is, for example, a resistance-capacitance circuit which is configured to provide a smoothing signal. Accordingly, the temperature variation between heating temperature and the preset temperature controlled by the heating control apparatus 100 may be improved to ±0.4° C.

On the other hand, since the comparator 150 is directly utilized to control the heating temperature of the heating module 110 in the embodiments of the invention, during a start-up stage of the three-dimensional printing apparatus applying the embodiments of the invention, before the micro control unit of the three-dimensional printing apparatus can provide the pulse width modulation signal PWM to the comparator 150, the heating temperature of the heating module 110 is already at room temperature (e.g., 25° C.). Therefore, the temperature sensing module 130 will provide the temperature sensing module TS having lower voltage value to the comparator 150, resulting that the comparator 150 controls the heating module 110 to continuously heat the object.

In order to avoid aforesaid situation, the heating control apparatus 100 can further include an inverter. The inverter is coupled to the processor (e.g., the micro control unit of the three-dimensional printing apparatus) and the comparator 150, and is configured to receive the pulse width modulation signal PWM provided by the pulse width modulation circuit 140. Among them, when the pulse width modulation signal PWM is not yet received by the inverter from the pulse width modulation circuit 140 co-constructed with the processor, a first level signal (e.g., the voltage value is −0.5V, −1V, 2V, etc.) is provided to the comparator 150. When the pulse width modulation signal PWM is received by the inverter from the pulse width modulation circuit 140 co-constructed with the processor, the pulse width modulation signal PWM is provided to the comparator 150. Accordingly, the three-dimensional printing apparatus is capable of controlling the heating module 110 to heat the nozzle only after the pulse width modulation signal PWM is provided by the pulse width modulation circuit 140.

Figure 6:
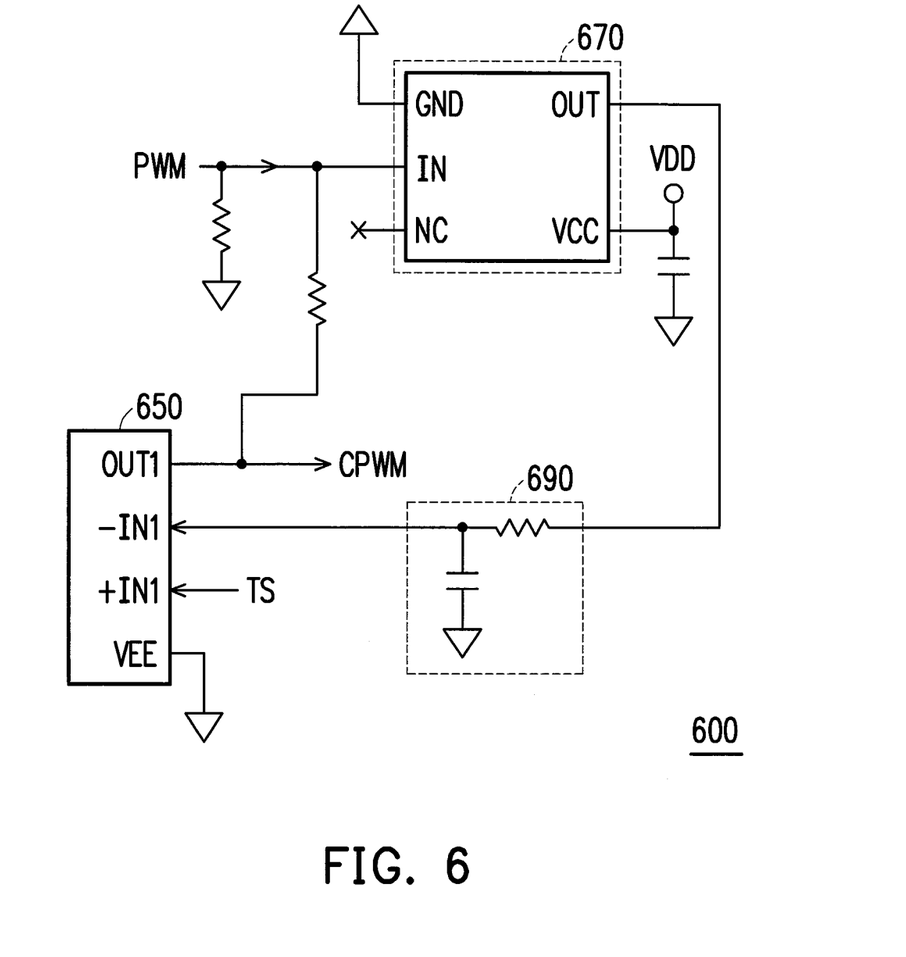
FIG. 6 is a local schematic diagram illustrating a heating control apparatus according to an embodiment of the invention.

For instance, FIG. 6 is a local schematic diagram illustrating a heating control apparatus according to an embodiment of the invention. Referring to FIG. 6, a heat control apparatus 600 includes a comparator 650, an inverter 670 and a resistance-capacitance circuit 690. Among them, the comparator 650 receives the temperature sensing signal TS through the temperature sensing module 130 of FIG. 1 and provides the comparing pulse width modulation signal CPWM to the heating module 110 of FIG. 1. When the pulse width modulation signal PWM (e.g., which is adjusted by the micro control unit and provided through the pulse width modulation circuit 140) is not yet received by an input pin IN of the inverter 670, an output terminal OUT of the inverter 670 provides a low level signal to the resistance-capacitance circuit 690, the resistance-capacitance circuit 690 outputs the adjusted pulse width modulation signal PWM to the comparator 650, and the temperature sensing signal TS is in response to the heating temperature at room temperature (e.g., 25° C.). Therefore, the comparator 650 can provide the comparing pulse width modulation signal CPWM with low level, such that the heating module 110 of FIG. 1 will not heat the nozzle. When the pulse width modulation signal PWM (e.g., which is adjusted by the micro control unit and provided through the pulse width modulation circuit 140) is received by the input pin IN of the inverter 670, the output pin OUT of the inverter 670 can provide the pulse width modulation signal PWM to the resistance-capacitance circuit 690, so as to control the heating module 110 of FIG. 1 to heat the object. In addition, the voltage value of the temperature sensing signal TS is reduced as the heating temperature of the heating module 110 of FIG. 1 is increased. When the voltage value of the temperature sensing signal TS is less than the average voltage of the pulse width modulation signal PWM, the heating module 110 of FIG. 1 stops heating the object.

Figure 7:
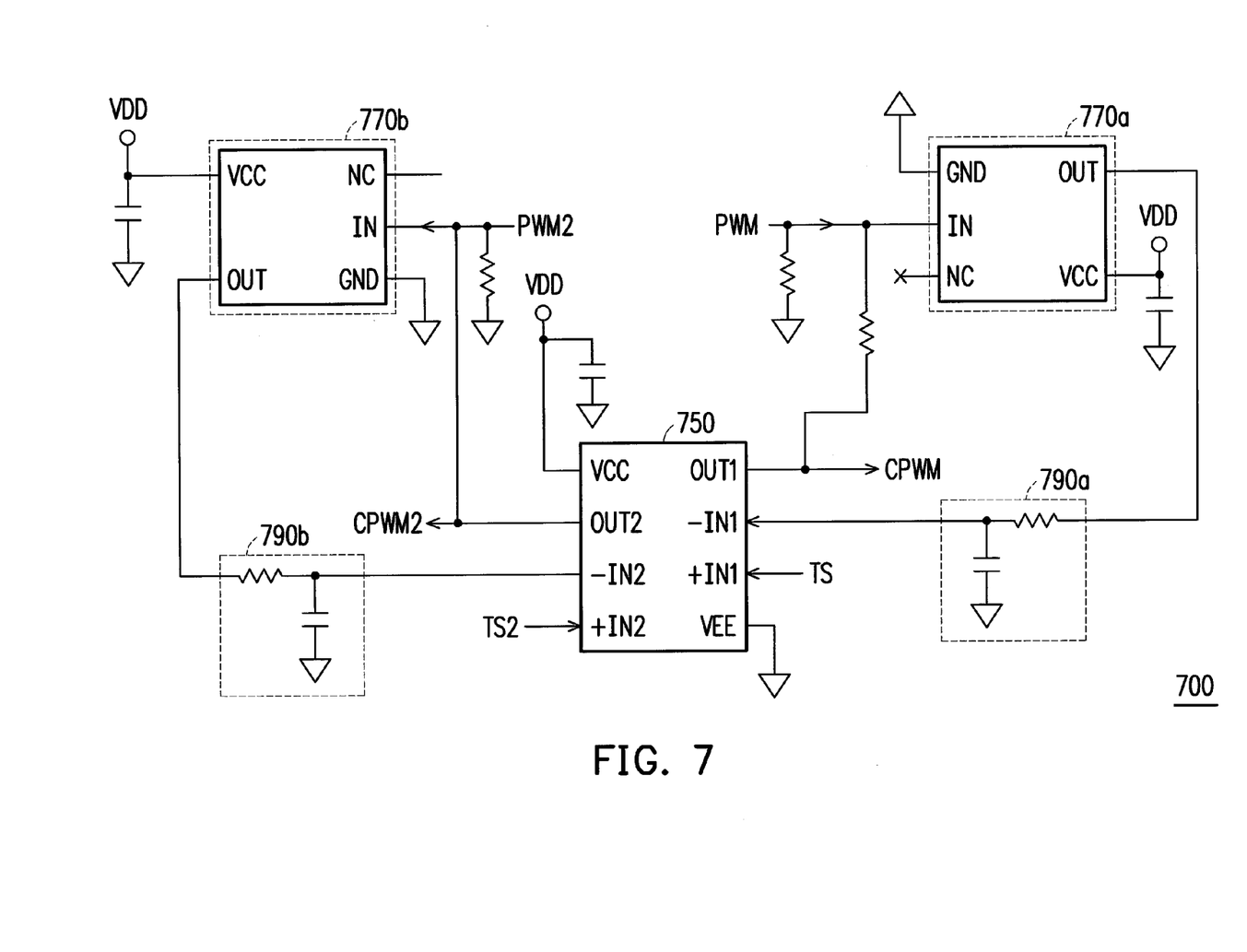
FIG. 7 is a local schematic diagram illustrating a heating control apparatus according to an embodiment of the invention.

The heating control apparatus of the invention may also be applied in a three-dimensional printing apparatus having more than two nozzles. This will be discussed with reference to an example provided as follows. FIG. 7 is a local schematic diagram illustrating a heating control apparatus according to an embodiment of the invention. Referring to FIG. 7, unlike the foregoing embodiments, as compared to the comparator 650 of FIG. 6, a comparator 750 further includes a power pin VCC, an output pin OUT2, a negative input pin −IN2 and a positive input pin +IN2. The negative input pin −IN2 receives a pulse width modulation signal PWM2 for controlling a heating temperature corresponding to a second nozzle (e.g., which is adjusted by the micro control unit and provided by the pulse width modulation circuit 140). The positive input pin +IN2 receives a temperature sensing module TS2 provided by another temperature sensing module in response to the heating temperature of the second nozzle. The output pin OUT2 provides a comparing pulse width modulation signal CPWM2 in order to control the heating temperature of the heating module corresponding to the second nozzle. In addition, related descriptions for inverters 770a and 770b and resistance-capacitance circuits 790a and 790b in a heating control apparatus 700 may refer the descriptions for the inverter 670 and the resistance-capacitance circuit 690 of FIG. 6, which are not repeated hereinafter. Accordingly, the three-dimensional printing apparatus with double nozzles which applies this example is capable of simultaneously and respectively controlling the heating modules of the two nozzles through the comparator 750.

In summary, in the heating control apparatus as described in the embodiments of the invention, the comparator is used to receive the temperature sensing signal provided by the temperature sensing module in response to the heating temperature of the heating module, and compare the temperature sensing signal with the pulse width modulation signal adjusted by the processor and provided by the pulse width modulation circuit, so as to control the heating temperature of the heating module according to the compared result. Accordingly, the three-dimensional printing apparatus applying the embodiments of the invention is capable of enhancing the reaction speed for controlling the heating temperature. In addition, the heating control apparatus of the invention may further include the additional buffer circuit, such that temperature variation between the heating temperature and the preset temperature can approach ±0.4° C., so as to improve the printing quality of the three-dimensional printing apparatus.

Although the exemplary embodiment has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

It will be apparent to those skilled in the art that various modifications and variations can be made to the structure of the exemplary embodiment without departing from the scope or spirit of the invention. In view of the foregoing, it is intended that the exemplary embodiment cover modifications and variations of this invention provided they fall within the scope of the following claims and their equivalents.

What is claimed is:

1. A heating control apparatus, comprising:
a heating module, configured to heat a nozzle;
a temperature sensing module, configured to sense a heating temperature of the heating module to correspondingly generate and provide a temperature sensing signal according to the heating temperature;
a pulse width modulation circuit, configured to generate a pulse width modulation signal; and
a comparator, having input terminals respectively coupled to the temperature sensing module and the pulse width modulation circuit and an output terminal coupled to the heating module, and configured to receive the temperature sensing signal and the pulse width modulation signal and compare the temperature sensing signal and the pulse width modulation signal to generate a comparing pulse width modulation signal in order to control the heating temperature of the heating module by using the comparing pulse width modulation signal.

2. The heating control apparatus of claim 1, wherein the pulse width modulation circuit is co-constructed with a processor, and the processor is coupled to the input terminals of the comparator in order to adjust the pulse width modulation signal through the pulse width modulation circuit.

3. The heating control apparatus of claim 2, further comprising:
an inverter, coupled to the processor and the comparator, and configured to receive the pulse width modulation signal, wherein the inverter provides a first level signal to the comparator when the pulse width modulation signal is not yet received by the inverter from the pulse width modulation circuit, and the inverter provides an inverted pulse width modulation signal to the comparator when the pulse width modulation signal is received by the inverter from the pulse width modulation circuit.

4. The heating control apparatus of claim 1, further comprising:
a buffer circuit, coupled to the pulse width modulation circuit and the comparator, and configured to receive the pulse width modulation signal and provide an adjusted pulse width modulation signal to the comparator.

5. The heating control apparatus of claim 4, wherein the buffer circuit comprises a resistance-capacitance circuit.

6. The heating control apparatus of claim 1, wherein the heating module comprises:
a switch transistor, coupled to the comparator, and configured to receive the comparing pulse width modulation signal, when the comparing pulse width modulation signal of a second level provided by the comparator is received by the switch transistor, the switch transistor being turned on in response to the comparing pulse width modulation signal of the second level in order to increase the heating temperature of the heating module accordingly, and when the comparing pulse width modulation signal of a third level is received by the switch transistor, the switch transistor being turned off in response to the comparing pulse width modulation signal of the third level in order to stop increasing the heating temperature of the heating module accordingly.

\* \* \* \* \*